United States Patent
Wiberg et al.

(10) Patent No.: US 10,531,399 B2
(45) Date of Patent: *Jan. 7, 2020

(54) RADIO RESOURCE MANAGEMENT FOR A HIGH-SPEED SHARED CHANNEL

(71) Applicant: Telefonaktiebolaget L M Ericsson (publ), Stockholm (SE)

(72) Inventors: Niclas Wiberg, Linkoping (SE); Eva Englund, Linkoping (SE); Sharokh Amirijoo, Sollentuna (SE); Gert-Jan van Lieshout, Apeldoorn (NL); Per Beming, Stockholm (SE); Stefan Parkvall, Stockholm (SE); Patrik Karlsson, Alta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,407

(22) Filed: Jan. 22, 2016

(65) Prior Publication Data
US 2016/0157236 A1    Jun. 2, 2016

Related U.S. Application Data

(60) Continuation of application No. 13/712,174, filed on Dec. 12, 2012, now Pat. No. 9,265,009, which is a
(Continued)

(30) Foreign Application Priority Data

May 13, 2002 (SE) ...................................... 0201467
Sep. 23, 2002 (SE) ...................................... 0202845

(51) Int. Cl.
*H04W 52/22* (2009.01)
*H04W 52/16* (2009.01)
(Continued)

(52) U.S. Cl.
CPC ........ *H04W 52/228* (2013.01); *H04B 17/382* (2015.01); *H04J 13/16* (2013.01);
(Continued)

(58) Field of Classification Search
CPC . H04W 24/08; H04W 72/0473; H04W 24/00; H04W 28/18; H04W 4/24;
(Continued)

(56) References Cited

U.S. PATENT DOCUMENTS 5,842,114 A    11/1998 Ozluturk
6,278,701 B1 *  8/2001 Ayyagari ............... H04B 7/264
                                                         370/310
(Continued)

FOREIGN PATENT DOCUMENTS

EP        1 061 762       12/2000
WO     2002/085059       10/2002

OTHER PUBLICATIONS

U.S. Appl. No. 10/371,199, filed Feb. 24, 2003; Inventor: Wiberg et al.
(Continued)

*Primary Examiner* — Steven H Nguyen
(74) *Attorney, Agent, or Firm* — Baker Botts, LLP

(57) ABSTRACT

Radio resources like spreading codes and transmission power are optimally allocated to various different types of radio channels supported in the cell including a specialized channel like a high-speed shared channel. One or more measurements made at the base station are provided to the radio resource manager. Such measurements include other-channel power, high speed shared channel code usage, high speed shared channel transport format usage, average active load on the high speed shared channel, empty buffer, excess power, and similar parameters that relate to a high speed shared channel. One or more of these reported measure-
(Continued)

ments may then be used to access, allocate, and/or to regulate resources associated with the base station's cell.

18 Claims, 10 Drawing Sheets

Related U.S. Application Data division of application No. 10/371,199, filed on Feb. 24, 2003, now abandoned.

(51) Int. Cl.
| | |
|---|---|
| *H04W 52/28* | (2009.01) |
| *H04J 13/16* | (2011.01) |
| *H04W 52/34* | (2009.01) |
| *H04W 72/08* | (2009.01) |
| *H04B 17/382* | (2015.01) |
| *H04W 52/08* | (2009.01) |
| *H04W 24/00* | (2009.01) |
| *H04W 24/08* | (2009.01) |
| *H04W 72/04* | (2009.01) |
| *H04W 28/18* | (2009.01) |
| *H04W 52/02* | (2009.01) |
| *H04W 52/14* | (2009.01) |
| *H04W 52/36* | (2009.01) |
| *H04W 52/24* | (2009.01) |
| *H04W 4/24* | (2018.01) |

(52) U.S. Cl.
CPC ........... *H04W 24/00* (2013.01); *H04W 24/08* (2013.01); *H04W 52/08* (2013.01); *H04W 52/16* (2013.01); *H04W 52/281* (2013.01); *H04W 52/286* (2013.01); *H04W 52/343* (2013.01); *H04W 72/0473* (2013.01); *H04W 72/085* (2013.01); *H04W 4/24* (2013.01); *H04W 28/18* (2013.01); *H04W 52/0206* (2013.01); *H04W 52/143* (2013.01); *H04W 52/246* (2013.01); *H04W 52/346* (2013.01); *H04W 52/367* (2013.01); *H04W 72/08* (2013.01); *Y02D 70/00* (2018.01); *Y02D 70/1242* (2018.01); *Y02D 70/1244* (2018.01)

(58) Field of Classification Search
CPC ............. H04W 52/0206; H04W 52/08; H04W 52/143; H04W 52/16; H04W 52/228; H04W 52/246; H04W 52/281; H04W 52/286; H04W 52/343; H04W 52/346; H04W 52/367; H04W 72/08; H04W 72/085; H04B 17/382; H04J 13/16; Y02D 70/00; Y02D 70/1242; Y02D 70/1244
See application file for complete search history.

(56) References Cited

U.S. PATENT DOCUMENTS

| | | | |
|---|---|---|---|
| 6,347,091 B1 | 2/2002 | Vilander et al. | |
| 6,785,247 B1* | 8/2004 | Lee | H04W 52/143 370/252 |
| 6,912,228 B1 | 6/2005 | Dahlman et al. | |
| 6,975,609 B1* | 12/2005 | Khaleghi | H04W 52/343 370/335 |
| 7,027,420 B2 | 4/2006 | Haemaelaeinen | |
| 7,050,761 B2 | 5/2006 | Hamabe | |
| 7,756,543 B2 | 7/2010 | Englund et al. | |
| 9,265,009 B2* | 2/2016 | Wiberg | H04W 24/00 |
| 2002/0102986 A1 | 8/2002 | Iwamura et al. | |
| 2002/0119798 A1* | 8/2002 | Hamabe | H04W 52/346 455/522 |
| 2003/0012217 A1* | 1/2003 | Andersson | H04W 36/06 370/437 |
| 2003/0086405 A1* | 5/2003 | Silva | H04L 41/145 370/342 |
| 2005/0018656 A1 | 1/2005 | Rudolf et al. | |
| 2005/0070319 A1 | 3/2005 | Pedersen | |
| 2005/0100038 A1 | 5/2005 | Pietraski et al. | |

OTHER PUBLICATIONS

Office Action dated Nov. 8, 2007 in U.S. Appl. No. 10/371,199.
Office Action dated Jul. 25, 2008 in U.S. Appl. No. 10/371,199.
U.S. Appl. No. 11/222,236, filed Sep. 9, 2005; Inventors: Englund et al.
Moulsley, T.J., et al. "Performance of UMTS High Speed Downlink Packet Access for Data Streaming Applications", Third International Conference on 3G Mobile Communication Technologies, 2002, (Conf. Publ. No. 489), May 8-10, 2002, pp. 302-307.
TSG RAN WGI, Change Request, 25.215 CR 134 V 5.2.0, 3GPP TSG-RAN Meeting 31, "Non-HSDPA Power Measurement" Feb. 2003, pp. 1-3.
Sophia Antipolis, RAN WG3, Change Request, 25.433 CR 801: "HS-DSCH: Addition of non HS-DSCH Power Measurement" 3GPP TSG-RAN3 Meeting 34, Feb. 17-21, 2003, pp. 1-18.
International Search Report PCT/SE03/00694.
Evolving WCDMA for Improved High Speed Mobile Internet, Parkvall et al, Future Telecommunications Conference Nov. 2001.
3rd Generation Partnership Project; Technical Specification Group Radio Access Network, High Speed Downlink Packet Access, 3GPP TS 25.308 V5.2.0 (Mar. 2002).
3GPP TSG-RAN3 Meeting #34, Feb. 2003, 25.433 CR 801, Tdoc R3-030283.
Performance of UMTS High Speed Downlink Packet Access for Data Streaming Applications, TJ Moulsley , pp. 302-307.
International Preliminary Report dated Sep. 16, 2004.
3GPP TSG-RAN Meeting #31, Feb. 2003, Tdoc RI-030206.
European official action dated Nov. 20, 2006 in corresponding European Application No. 03 721 255.2.
Stefan Parkvall et al., Evolving WCDMA for Improved High Speed Mobile Internet, Nov. 28, 2001, 5 pgs.

* cited by examiner

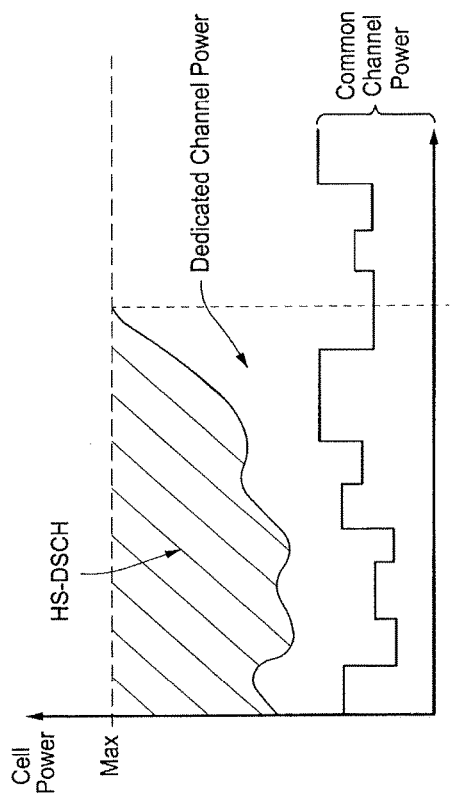

RADIO RESOURCE MANAGEMENT FOR A HIGH-SPEED SHARED CHANNEL

PRIORITY

This application is a continuation, under 35 U.S.C. § 120, of U.S. application Ser. No. 13/712,174 filed Dec. 12, 2012, which is a divisional, under 35 U.S.C. § 121, of U.S. application Ser. No. 10/371,199 filed Feb. 24, 2003, entitled "Radio Resource Management For A High-Speed Shared Channel" both of which are hereby incorporated by reference in their entirety.

INTRODUCTION

The technology relates to radio communications, and more particularly, to radio resource management for a high speed shared channel.

BACKGROUND AND SUMMARY

Third generation (3G) Universal Mobile Telephone communications Systems (UMTS), based on Wideband Code Divisional Multiple Access (WCDMA) radio access, provide wireless access at high data rates and support enhanced bearer services not realistically attainable with first and second generation mobile communication systems. A WCDMA radio access network, like the UMTS Terrestrial Radio Access Network (UTRAN), also enhances quality of service by providing robust operation in fading environments and transparent (soft/softer) handover between base station/base station sectors. For example, deleterious multipath fading is used to improve received signal quality with RAKE receivers and improved signal processing techniques.

Demand continues for improved multimedia communications in the UTRAN including higher peak data rates, lower radio interface delay, and greater throughput. A High Speed-Downlink Shared Channel (HS-DSCH) is standardized for use in WCDMA UTRAN networks to support higher peak rates on the order of 8-14 megabits per second. One of the ways the HS-DSCH achieves higher data speeds is by shifting some of the radio resource coordination and management responsibilities to the base station from the radio network controller, including one or more of the following briefly described below: shared channel transmission, higher order modulation, link adaptation, radio channel dependent scheduling, and hybrid-ARQ with soft combining.

Shared Channel Transmission and Higher Order Modulation:

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

Link Adaptation and Rate Control:

Radio channel conditions experienced on different communication links typically vary significantly, both in time and between different positions in the cell. In traditional CDMA systems, power control compensates for differences in variations in instantaneous radio channel conditions. With this type of power control, a larger part of the total available cell power may be allocated to communication links with bad channel conditions to ensure quality of service to all communication links. But radio resources are more efficiently utilized when allocated to communication links with good channel conditions. For services that do not require a specific data rate, such as many best effort services, rate control or adjustment can be used to ensure there is sufficient energy received per information bit for all communication links as an alternative to power control. By adjusting the channel coding rate and/or adjusting the modulation scheme, the data rate can be adjusted to compensate for variations and differences in instantaneous channel conditions.

Channel Dependent Scheduling and Hybrid ARQ:

For maximum cell throughput, radio resources may be scheduled to the communication link having the best instantaneous channel condition. Rapid channel dependent scheduling performed at the bases station allows for very high data rates at each scheduling instance and thus maximizes overall system throughput. Hybrid ARQ with soft combining increases the effective received signal-to-interference ratio for each transmission and thus increases the probability for correct decoding of retransmissions compared to conventional ARQ. Greater efficiency in ARQ increases the effective throughput over a shared channel.

FIG. 1 illustrates a high speed shared channel concept where multiple users 1, 2, and 3 provide data to a high speed channel (HSC) controller that functions as a high speed scheduler by multiplexing user information for transmission over the entire HS-DSCH bandwidth in time-multiplexed intervals. For example, during the first time interval shown in FIG. 1, user 3 transmits over the HS-DSCH and may use all of the bandwidth allotted to the HS-DSCH. During the next time interval, user 1 transmits over the HS-DSCH, the next time interval user 2 transmits, the next time interval user 1 transmits, etc.

High-speed data transmission is achieved by allocating a significant number of spreading codes (i.e., radio resources in CDMA systems) to the HS-DSCH. FIG. 2 illustrates an example code tree with a fixed Spreading Factor (SF) of sixteen. A subset those sixteen codes, e.g., twelve, is allocated to the high-speed shared channel. The remaining spreading codes, e.g., four are shown in the figure, are used for other radio channels like dedicated, common, and broadcast channels.

Although not necessarily preferred, it is also possible to use code multiplexing along with time multiplexing. Code multiplexing may be useful, for example, in low volume transmission situations. FIG. 3 illustrates allocating multiple spreading codes to users 1, 2, and 3 in code and time multiplexed fashion. During transmission time interval (TTI) 1, user 1 employs twelve codes. During transmission time interval 2, user 2 employs twelve spreading codes. However, in transmission time interval 3, user 1 uses two of the codes, and user 3 uses the remaining ten codes. The same code distribution occurs in TTI=4. In TTI=5, user 3 uses two of the codes while user 2 uses the remaining codes.

To achieve higher throughput and high peak data rates, a high speed shared channel may not use closed loop power control, (as dedicated channels do), but instead simply uses the remaining power in the base station cell up to a preset maximum. Because the high speed shared channel is used along with other channels, radio resources must be allocated to the different channels efficiently and without overloading the cell with too high of a power level. The power level for channels other than the high-speed shared channel must be managed to leave sufficient power for the shared channel to have the desired, high throughput.

The code assignment affects the throughput on the high-speed shared channel as well as the available code space for other channels. An optimal code assignment depends on several factors, such as traffic load, the type of traffic, and current radio conditions. If too many CDMA codes are assigned to the high-speed shared channel, some of those codes may be underutilized, which is a waste of radio resources. If too few codes are assigned, the channel throughput over the high-speed shared channel is too low.

The radio network controller (RNC) performs radio resource management. Radio resources like spreading codes are allocated using one or more resource management algorithms. Other examples of such resource management include power/interference control, admission control, congestion control, etc. The radio network controller can better perform its resource management tasks if it knows the current resource status or use in the cell. One measurement useful to the radio network controller is how often the codes currently allocated to the high-speed shared channel are being used. The technology described herein provides measurements from the base station to the radio network controller about the usage of the set of codes currently allocated to a particular channel, like a high speed shared channel. Based on those measurements, the RNC can adjust (if necessary) the code allocation to the high speed shared channel.

Another managed radio resource that needs judicious allocation to different radio channels in a base station cell is radio transmission power level. FIG. 4 shows a graph of base station cell power against time. The radio transmission power for one or more common channels, shown in the bottom graph, takes up a first portion of the allowed or maximum cell power. On top of the common channel power is the combined radio transmission power currently allocated to the dedicated channels. The hatched portion shows the radio transmission power that can be used by the high-speed shared channel. At time $t_m$, the combined common and dedicated channel power equals the maximum cell power. As a result, the high speed shared channel has no available power, and therefore no throughput, assuming the maximum cell power level is observed. On the other hand, if the high speed shared channel uses more than the maximum cell power, signals may be distorted leading to degraded quality of service.

On request from the RNC, base stations may provide measurements to the RNC, e.g., channel quality estimates for rate selection. But such base station measurements do not take into account the special nature of a high-speed downlink shared channel (HS-DSCH). Indeed, one typical base station measurement provided to the RNC is total transmitted carrier power for all downlink channels. That measurement would include the transmission power for the high-speed shared channel. Including the high-speed downlink shared channel in the total transmitted carrier power measurement presents a problem. First, the HS-DSCH, by design, typically uses all of the remaining transmission power up to the cell maximum. Second, the RNC uses the total transmission power measurement to decide whether to set up new dedicated radio channels. Consequently, the RNC will always conclude that the cell is operating at full capacity as long as there is a moderate traffic demand on the high-speed downlink shared channel. For the same reason, channel requests will be denied as soon as there is even moderate traffic demand on the high-speed downlink shared channel. Nor is it possible in this situation to determine an accurate congestion level in the cell. Because the high speed shared channel uses the remaining cell power, the total carrier power measurement will always be equal or close to the cell maximum erroneously suggesting that the cell is always fully loaded.

The technology provides a cell transmission power measurement to a radio resource manager that specifically takes into account a high-speed shared channel even where that channel is designed to use the remaining transmission power in a cell up to a cell maximum. The radio network controller is informed when a high speed shared channel has little or no power available because of increasing power demands required by channels other than the high speed shared channel. Other parameters may also be measured at the base station that may be useful to a radio resource controller.

One or more base station measurements provided to a radio resource manager allows it to optimally access, allocate, and/or regulate radio resources, like spreading codes and transmission power, to different types of radio channels supported in the cell, including a specialized channel like a high-speed shared channel. Such measurements include one or more of the following: other-channel power, HS-DSCH code usage, transport format usage, average active load, empty buffer, excess power, and/or similar parameters.

In one example embodiment, transmission power is measured for signals transmitted over first radio channels that do not include measurement of a transmission power for signals transmitted over a second radio channel, e.g., a high speed shared channel. CDMA code usage may also be measured for the second channel during a predetermined time period. One or both of the measured transmission power and the measured CDMA code usage are reported to a radio resource controller which may take appropriate resource management action(s). In a preferred example, the first and second channels are downlink radio channels from the CDMA mobile communications network to one or more of the mobile radios. The first radio channels include one or more of the following: one or more dedicated channels, one or more common channels, one or more control channels, and one or more broadcast channels. The second channel is a high speed downlink shared channel.

The measured transmission power may be used to perform radio resource control such as power allocation to the second radio channel and/or the first radio channels, code allocation to the second radio channel and/or first radio channel, congestion control, and admission control. The measurement also alerts the radio resource controller to situations where the power being used by the other channels leaves insufficient or rapidly decreasing power for the HS-DSCH. The radio resource controller may take appropriate action to reallocate power resources to ensure there is sufficient power for the HS-DSCH to function.

Using the measured CDMA code usage information, a determination may be made whether CDMA codes currently allocated to the second radio channel are being efficiently used. If not, the current CDMA code allocation for the second radio channel is changed. In one implementation, the predetermined time period includes plural transmission time intervals (TTIs). The number of TTIs that a CDMA code is used for the second radio channel during the determined time period is measured. Alternatively, a number of TTIs that a set of the CDMA codes is used for the second radio channel during the predetermined time period may be measured. The CDMA code usage measurement may be reported in any number of fashions. In one example, the code usage is reported to the resource manager as a histogram.

Other example base station measurements may be used alone or in combination with each other and/or those measurements described above. For example, a number of mobile radio users may be measured that currently have data to transmit over the high speed shared channel in a base station buffer at a data transmission scheduling time for the high speed shared channel. The measured number corresponds to an active load and is provided to a radio network controller for use in managing a load on the high speed shared channel. A buffer monitor may be used to measure an amount of data being buffered per high speed shared channel user. A number of high speed shared channel transmission time intervals (TTIs) is determined over a measurement period when the measured amount of buffered data reaches zero or is below a threshold. The measured number can be used to (re)configure the high speed shared channel. An excess power monitor may be used to measure a first power level actually used for transmission to a mobile radio user over the high speed shared channel and determine a second power level required for reliable transmission to the mobile radio user over the high speed shared channel. The difference between the first and second power levels is calculated and used in allocating resources associated with the high speed shared channel.

The technology enables efficient radio resource management without excessive signaling. By accounting for the specific characteristics of a particular type of channel, like a high-speed shared channel, one or more measurements in accordance with the present invention permits an accurate estimate of current cell conditions. As a result, a radio resource manager can better control cell congestion, admit new users to the cell, block new users, or even drop existing users, if necessary. Actions can be taken to ensure that maximum power limitations are not exceeded before the maximum power is reached which would otherwise result in unpredictable signaling distortion and poor signal quality. Moreover, the technology allows the radio resource controller to ensure the high-speed shared channel has enough resources to fulfill its job as a high-speed shared channel. Since spreading codes are a limited resource in a CDMA system, an optimal code allocation is assured to various channels, which is particularly advantageous for a high-speed shared channel. Proper code allocation to a high-speed shared channel ensures optimal performance of that channel without under-utilizing or otherwise wasting radio resources.

BRIEF DESCRIPTION OF THE DRAWINGS

FIG. 3 illustrates a time division code division multiplex diagram in conjunction with the high speed downlink shared channel;

FIG. 4 is a cell power diagram;

DETAILED DESCRIPTION

In the following description, for purposes of explanation and not limitation, specific details are set forth, such as particular embodiments, procedures, techniques, etc. However, it will be apparent to one skilled in the art that the technology may be practiced in other embodiments that depart from these specific details. For example, while the technology is described in an example application to a CDMA-based cellular system that uses a high-speed downlink shared channel, the technology may be employed in any cellular system having different types of channels.

In some instances, detailed descriptions of well-known methods, interfaces, devices, and signaling techniques are omitted so as not to obscure the description with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 5:
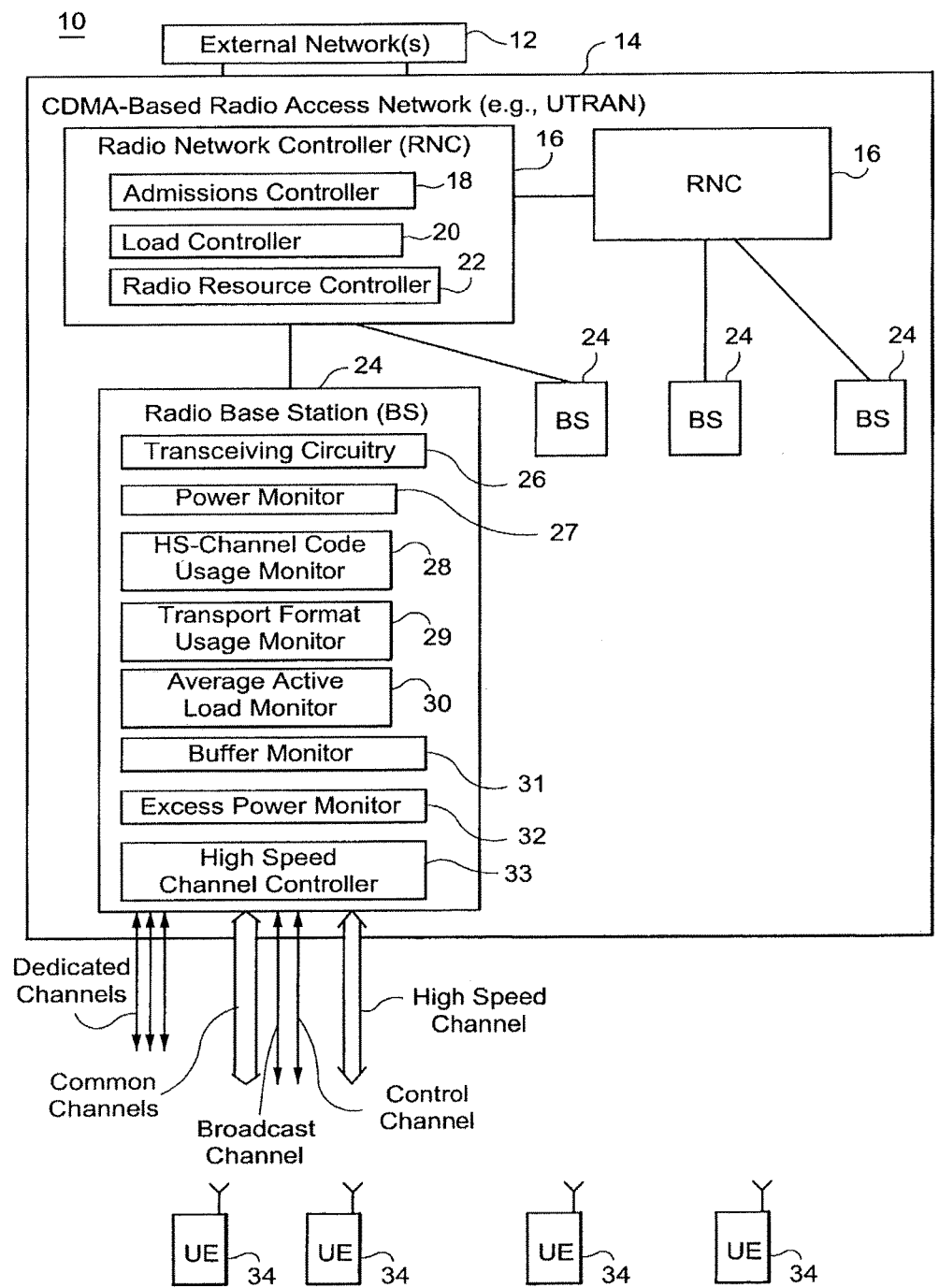
FIG. 5 is a function block diagram illustrating one example embodiment in the context of a mobile radio communications system.

The technology finds advantageous, but still example, application to a CDMA mobile communications network such as that shown at reference numeral 10 in FIG. 5. Plural external networks 12 are coupled to a CDMA-based radio access network 14 which, for example, may be a UMTS Terrestrial Radio Access Network (UTRAN). The UTRAN 14 includes one or more radio network controllers (RNC) 16 which communicate over a suitable interface. Each RNC 16 may include, among other things, an admissions controller 18, a cell load controller 20, and radio resource controller 22. Each of the controller entities may be implemented in hardware, software, or a combination of both. Each RNC 16 is coupled to plural radio base stations (BS) 24. Each radio base station 24 includes, among other things, radio transceiving circuitry 26, one or more transmit power monitors 27, a high speed channel code usage monitor 28, a transport format usage monitor 29, average active load monitor 30, empty buffer monitor 31, excess power monitor 32, and a high speed channel controller 33. The radio base station 24 communicates over a radio interface with various mobile stations identified as user equipments (UE) 34. Communications over the radio interface are made using spreading codes, i.e., one or more spreading codes corresponds to a radio channel.

Figure 1:
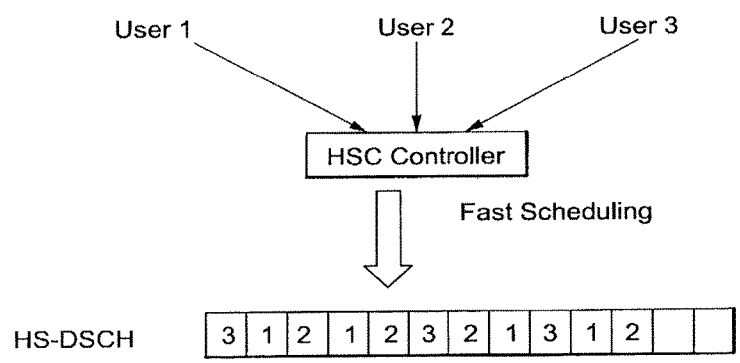
FIG. 1 illustrates conceptually a high speed downlink shared channel.
Figure 2:
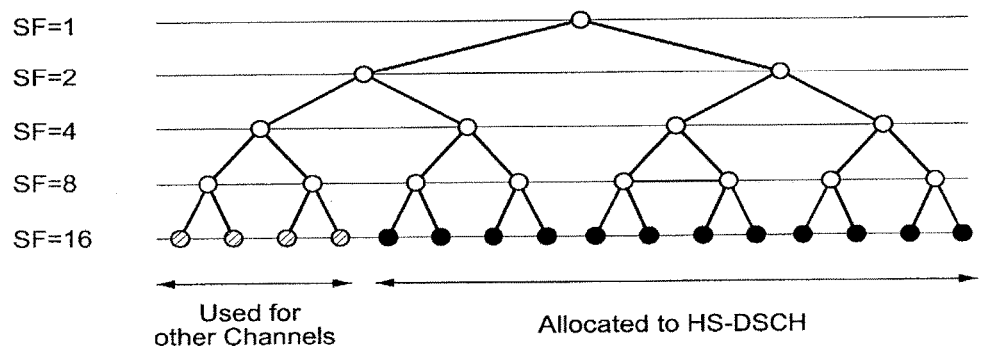
FIG. 2 illustrates a code tree.

System 10 includes different types of radio channels: one or more dedicated channels, one or more common channels, one or more broadcast channels, and a high speed shared channel such as a high speed downlink shared channel (HS-DSCH). Although an HS-DSCH is used in the examples below, the technology is not limited to HS-DSCHs. Base station 24 has a particular number of spreading codes available for use. See the example code tree with a spreading factor of 16 shown in FIG. 2. A certain number of the available spreading codes will be allocated to the high speed downlink shared channel, and the remaining codes are allocated to the other channels. The technology strives to allocate the optimal number of spreading codes to the high speed downlink shared channel and to the other channels. The optimal allocation ensures that a desired data rate, throughput, and/or quality of service is/are provided over the high speed downlink shared channel while efficiently using all of the codes allocated to the high speed downlink shared channel. The high speed channel code usage monitor 28 provides the RNC 16 with actual spreading code usage for the high speed downlink shared channel over a predetermined period of time.

Similarly, each base station cell is assigned a maximum downlink radio transmission power level. Transmission power is distributed amongst the various channels in the cell. In the power distribution shown in FIG. 4, the common channels use a certain transmission power, the dedicated channels are allocated transmission power on top of the common channel power, and the high speed channel uses whatever transmission power remains up to the maximum power established or some other predefined limit for that cell.

The high speed channel controller 33 may perform the various functions described above for the high speed downlink shared channel such as shared channel transmission, higher order modulation, link adaptation, radio channel dependent scheduling, and hybrid-ARQ with soft combining. Particularly, the high speed channel controller 33 controls fast scheduling of transmissions (and retransmissions) over the high speed downlink shared channel in each transmission time interval (TTI). The high speed controller 33 preferably allocates all of the codes allocated to the high speed downlink channel, e.g., twelve codes in the code tree of FIG. 4, to a single mobile radio UE connection in one TTI But if the payload is insufficient for a single UE connection, or if the UEs are low-end UEs, code division multiplexing may also be employed by the radio resource controller 22 as explained above with regard to FIG. 3. For the admissions controller 18 to perform admissions control, the load controller 20 to perform load control, and the radio resource controller 22 to optimally manage radio resources in each cell, the RNC 16 must receive relevant and accurate measurement information from the base station 24.

Figure 6:
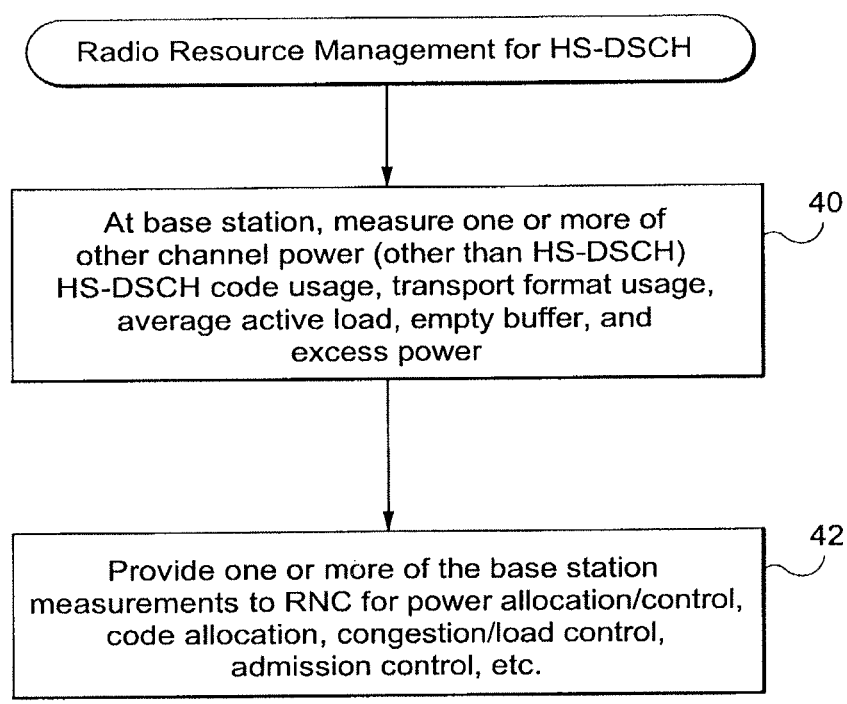
FIG. 6 is a flowchart diagram illustrating radio resource management procedures for a high-speed shared channel in accordance with one example embodiment.

In a first general example embodiment, one or more measurements are made and reported by the base station and used by a resource controller, which in this non-limiting example, is located the RNC. Refer to the Radio Resource Management for a High Speed Downlink Shared Channel procedures shown in flowchart form in FIG. 6. In the first step (block 40), the base station measures one or more of the following parameters: "other" channel power (other than HS-DSCH channel power), a HS-DSCH code usage, transport format usage, average active load, empty buffer, and excess power. Each of these example base station measurements is described below. However, it should be understood that these measurements are only non-limiting examples.

The base station sends to the RNC one or more of the base station measurements, and the resource controller 22 in the RNC uses that measurement information to perform power allocation and perhaps power control on the dedicated channels based upon the reported measurements. It also adjusts spreading code allocation adjustments based upon the reported measurements. The admissions controller 18 uses these measurements as a factor in determining whether to admit new call requests. The load controller 20, with this same information, determines whether congestion/load control is required in this cell (block 42).

Other Channel Power:

Other channel power is transmission power attributable to transmissions made over one or more channels other than the high speed downlink shared channel. In this example, it includes the power of all channels but the high speed downlink shared channel. These channels may include, for example, one or more dedicated channels dedicated to a connection between the UTRAN 14 and the UEs 34, one or more common channels shared by the mobile radios, one or more control channels, and one or more broadcast channels. Other channel power may be measured by the power monitor 27 in the example manner described in conjunction with FIG. 8.

Figure 7:
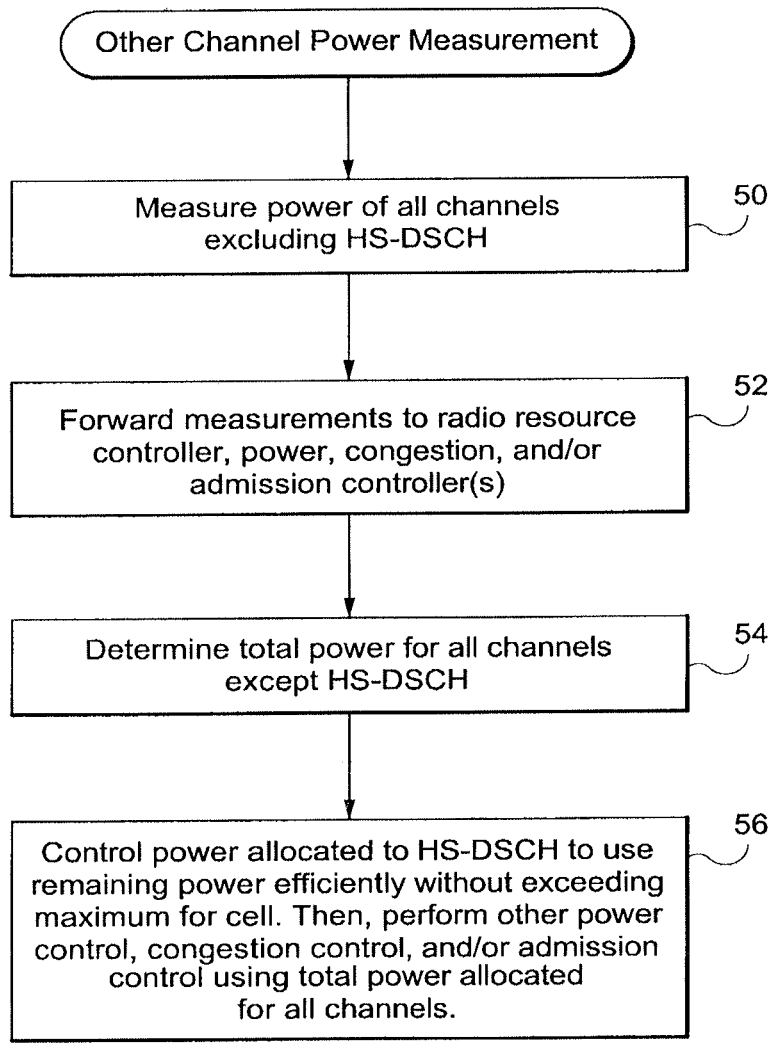
FIG. 7 is flowchart illustrating example other channel power measurement procedures.

Example Other Channel Power Measurement procedures are illustrated in flowchart form in FIG. 7. The total power of all (or only some) downlink channels from the base station is measured with the exception of the transmission power of the high speed downlink shared channel (block 50). The total power measurement(s) is(are) forwarded to the RNC and used by one or more resource controllers like the radio resource controller 22, the load controller 20, and the admission controller 18 (block 52). Based on the measurements, the RNC (or the base station) determines the total power for the downlink channels except the high-speed downlink shared channel (block 54). If this power exceeds the threshold where there is not sufficient power remaining for the high speed downlink channels, then the RNC may take various actions to limit the power needed for other downlink channels. Such actions may include switching dedicated channels to a lower rate, e.g., congestion control, and/or admission control.

The power allocated to the high speed downlink shared channel is controlled so that the remaining power in the base station cell is used without exceeding (at least not significantly) the maximum power designed for that cell (block 56). Other power control operations such as power control for one or more of the dedicated channels, congestion control, and/or admission control may be performed using the total power measurement. In addition, the base station preferably notifies the RNC when there is little or no transmission power available for the high speed downlink shared channel.

The transmitted signal is the sum of the signals from all individual physical channels, including common physical channels, dedicated physical channels, and shared physical channels (in particular the high-speed shared physical channel). The preferred, example implementation is to sum all signals except from the high speed shared physical channel(s). The other channel power is measured by taking the average of the squared chip magnitudes of the signal sum. The signal to be transmitted is formed by adding the HS-DSCH signal to that signal sum.

Alternatively, the power measurement can be formed as a sum of several individual power measurements made on individual channel signals, or on sums of subsets of non-shared channel signals. This can be advantageous if the summing of the signals in an implementation must be done in a certain order different from the one described above. Individual power measurements are made by averaging the squared chip magnitudes of the individual channel signals or of the subsets.

If the individual power measurements are performed on individual channel signals (and not on subsets), the power measurements may be generated more easily based on knowledge of the configured transmission power and the current usage of each channel. The measured power value of an individual channel signal is then formed as the product of the squared gain factor for that signal and the activity factor for that channel. The activity factor is the ratio of the number of actually transmitted symbols to the total number of symbols.

Figure 8:
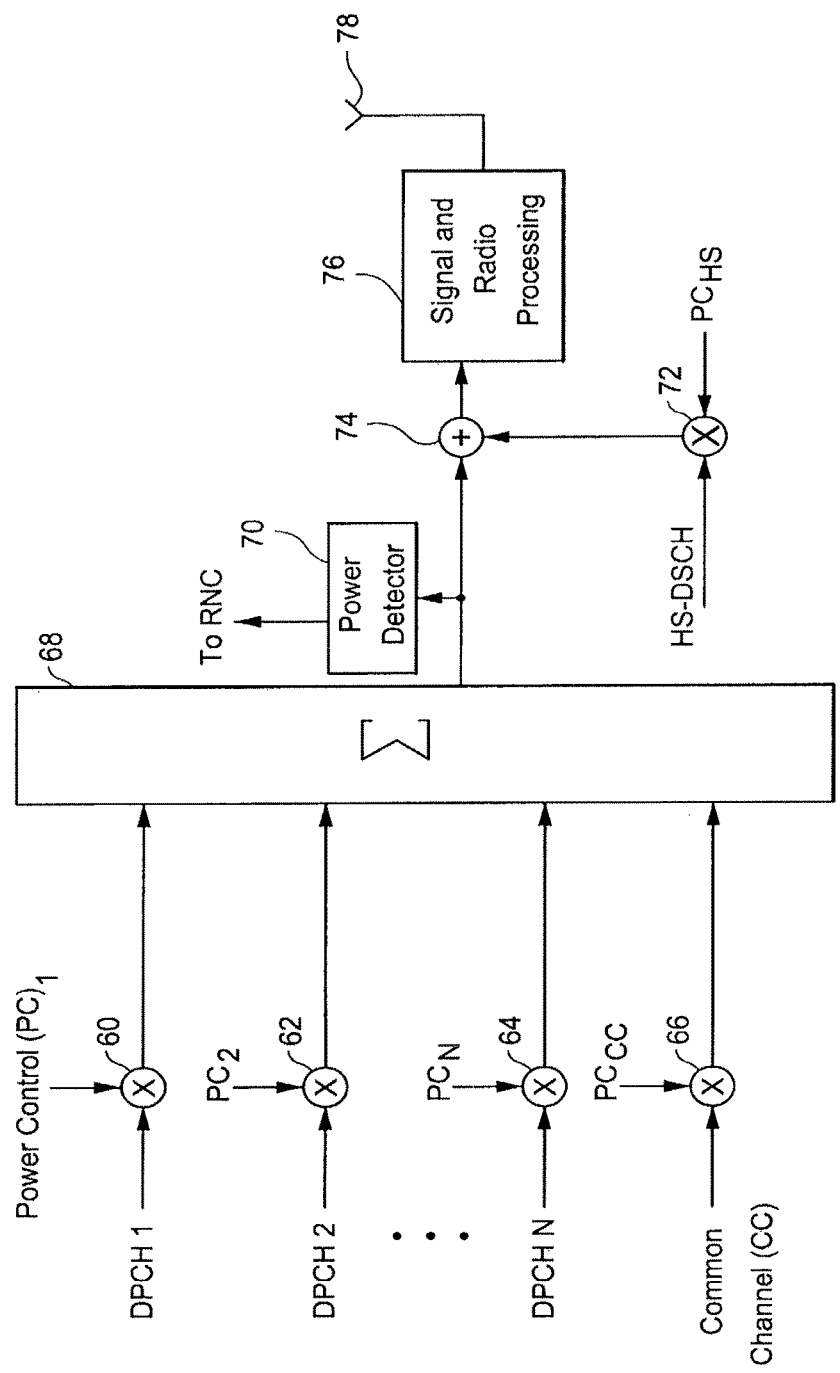
FIG. 8 is a block diagram illustrating one way to perform other channel power measurement.

FIG. 8 shows one example way in which other channel power may be measured at the base station. In this case, the other channels include dedicated physical channels (DPCH) 1, 2, . . . , N and a common channel (CC). Each other channel signal is multiplied in a corresponding multiplier 60, 62, 64, and 66 by an appropriate gain or power control. (PC) value chosen according to the power control commands for that specific channel. The power control commands signaled from the UE to inform the base station what power is needed for keeping specified signal quality for that specific channel. The power control command and common channel signals are summed together in summer 68, and the total power is determined in power detector 70 by taking the average of the squared chip magnitudes of the signal sum. Each chip in a spreading code has an I and a Q component so that its power=$\sqrt{I^2+Q^2}$. The measured power of an individual channel signal may be determined as the product of the squared gain or power control (PC) factor for that signal and an activity factor for that channel, defined above. As an alternative mentioned above, subsets of the non-shared channel signals can be summed.

The total other channel power is provided to the RNC as indicated. The total other channel power is also summed in a summer 74 with the power of the high speed downlink shared channel. Although the HS-DSCH is not power controlled in the same manner as dedicated channels, the power must be set according to the power needed for other channels. Because the HS-DSCH uses the remaining power, which varies over time, the HS-DSCH power also varies. Thus, the PC factor for the HS-DSCH depends on the measured, non-HS-DSCH power. The sum of all downlink channels including the HS-DSCH is processed in the signal and radio processing block 76 and transmitted via antenna 78.

HS-DSCH Code Usage/Transport Format Usage:

The high speed channel code usage monitor 28 measures the HS-DSCH code usage over a predetermined time period. A code resource/transport format usage measurement procedure is illustrated in flowchart form in FIG. 9. For each high speed downlink shared channel transmission time interval (TTI), e.g., two milliseconds, a transport format is selected by the high speed channel controller 33. The transport format specifies a particular number of spreading codes up to the allocated number of codes for use by the high speed downlink shared channel (block 80). The high speed channel controller 33 may also decide not to transmit over the high speed downlink shared channel during a TTI which would correspond to using zero spreading codes. Over a predetermined time period, such as 100 milliseconds, the high speed channel code usage monitor 28 measures a number of transmission time intervals (TTIs) that each spreading code is used by the high speed downlink shared channel. Alternatively, the monitor 28 may measure a number of TTIs that each particular set of codes is used by the high speed downlink shared channel (block 82). An example of the latter might be that a set of codes including codes 1 through 6 is used in only two TTIs. A set of codes including just codes 1 and 2 is used in twenty-five TTIs. A transport format usage monitor 29 may additionally or alternatively measure a number TTI's that each transport format is used.

The code usage data detected by the monitor 28 and/or the transport format usage data detected by the monitor 29 for the predetermined time period is provided to the RNC. In one non-limiting example, the code usage information and/or the transport format usage data may be delivered in the form of a usage histogram. The radio resource controller (RRC) 22 in the RNC 16 determines whether to change the code allocation for the high speed downlink shared channel based on that code usage data or the transport format based on that transport format usage data (block 84).

Figures 9, 10:
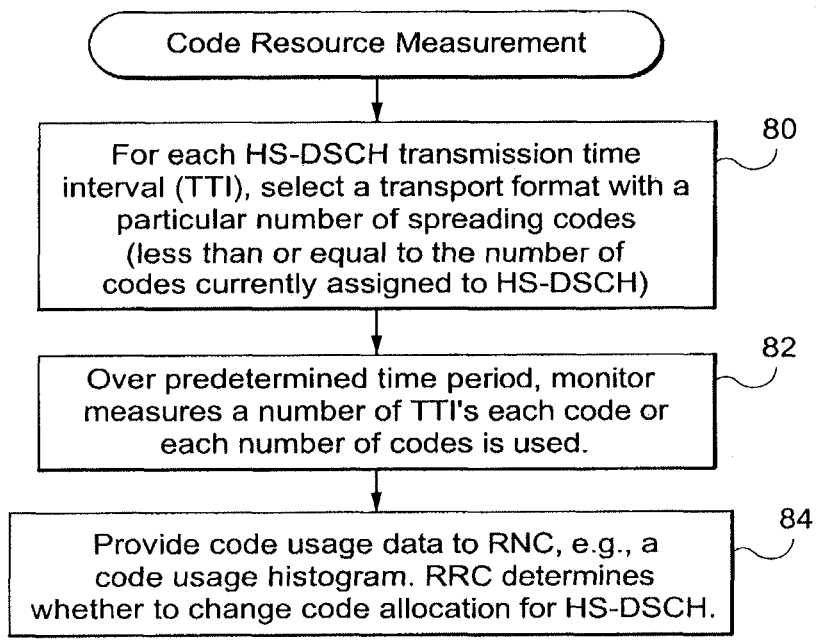
FIG. 9 is a flowchart illustrating example code resource measurement procedures.
FIG. 10 illustrates a code usage/transport format usage measurement.

FIG. 10 gives an example histogram mapping spreading codes 1 through 12 allocated for each two millisecond TTI for the high speed downlink shared channel, the high speed channel controller 33 selects a transport format. Of course, the entire histogram need not be sent over the radio interface but some abbreviated form of the histogram information could be transmitted instead. The code usage measurement need not include all possible number of codes. Alternatively, the number of times any subset of codes is used, for example 0-3, 4-7, 8-11, 12-15, etc., may be measured. As another alternative, the proportion of HS-DSCH TTI's for each code subset may be measured, or the time or proportion of time that each code subset is used.

The HS-DSCH code usage measurement may be generalized and expressed statistically as a function of the transport formats used. Based on certain available information, such as buffer status, channel conditions, available power resources, etc., the high speed channel controller 33 selects one of the transport formats. During a defined time interval, the base station transport format usage monitor 29 counts the number of times each transport format is used for the HS-DSCH. The result is a two-dimensional histogram describing for each transport format the number of times this transport format is used. The measurement can either be the two-dimensional histogram or a function thereof.

Figure 11:
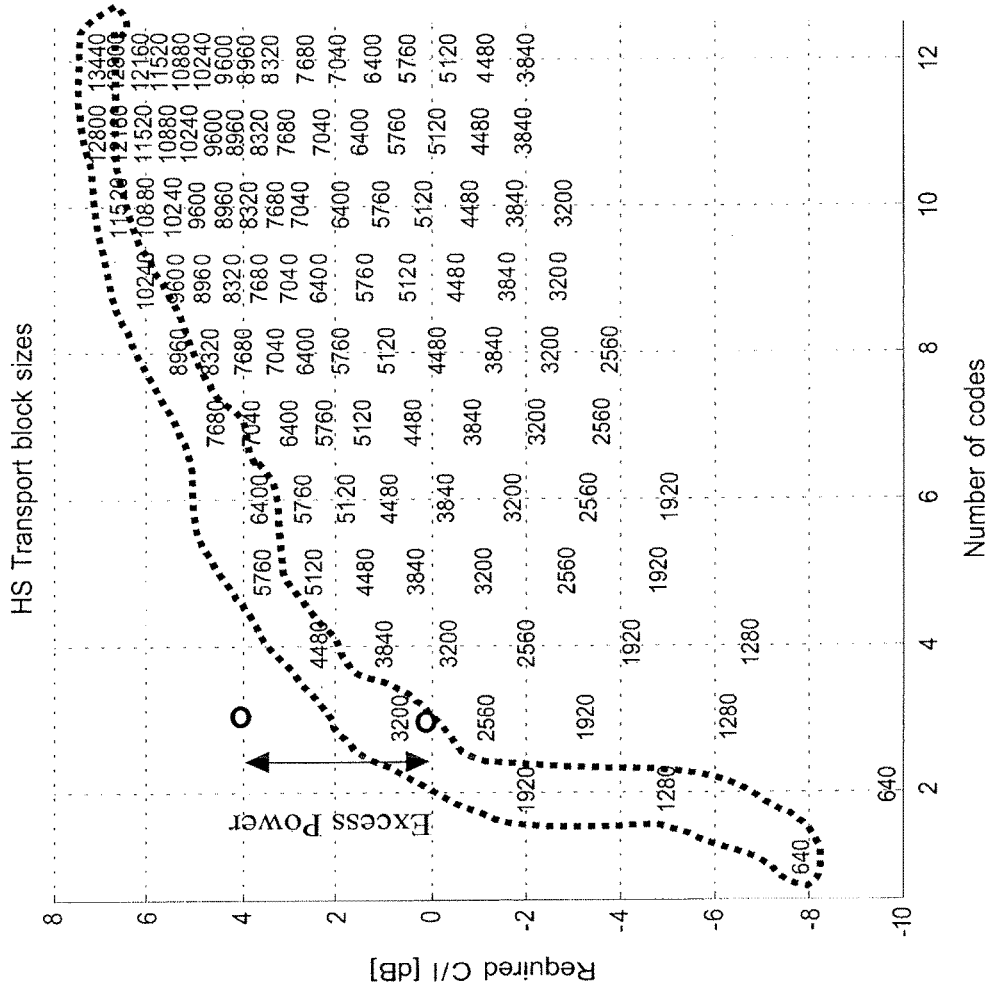
FIG. 11 is a graph illustrating certain base station measurements.

FIG. 11 illustrates an example of forming statistics over the set of possible transport formats. The numbers shown in the graph represent the transport block size (payload). The x-axis is the number of spreading codes used for the HS-DSCH. The y-axis represents the signal-to-noise ratio required for transmission expressed as a carrier-to-interference (C/I) ratio. The dotted line exemplifies a group of transport formats and is described in the text.

In a preferred, example embodiment, groups of transport formats are defined and only the number of times any transport format within this group is used is reported. In FIG. 11, a dotted line illustrates an example of such a group of transport formats including for each number of spreading codes, the transport format with the largest payload. Frequent use of transport formats in this group indicates the HS-DSCH is limited in the number of spreading codes rather than in the available energy. If possible, the RNC should assign more spreading codes to the HS-DSCH in order to increase its capacity.

As an alternative to reporting the number of times each group is used, the fraction of TTIs in each transport format group can be measured or the proportion of time that each transport format group is used. A relative measurement, e.g., the number of times one transport format group is used in relation to another transport format group, may be used. Furthermore, the statistics may be collected and reported individually for several data streams with different priorities. Individual statistics for each priority level used for packet data streams for the HS-DSCH are reported. In this situation, the RNC may be configured to act only on measurements for streams for which it wants to guarantee a certain quality of service.

Figure 12:
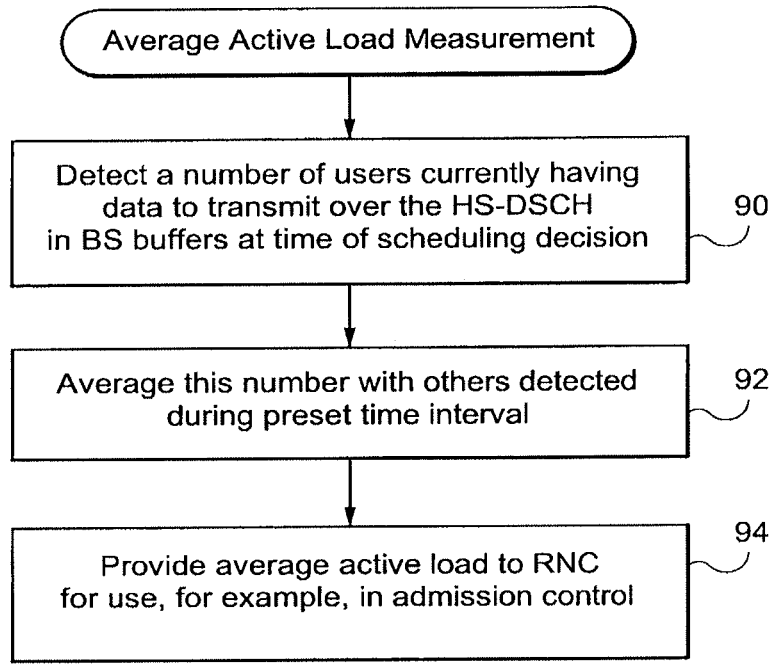
FIG. 12 is a flowchart illustrating example average active load measurement procedures.
Figure 13:
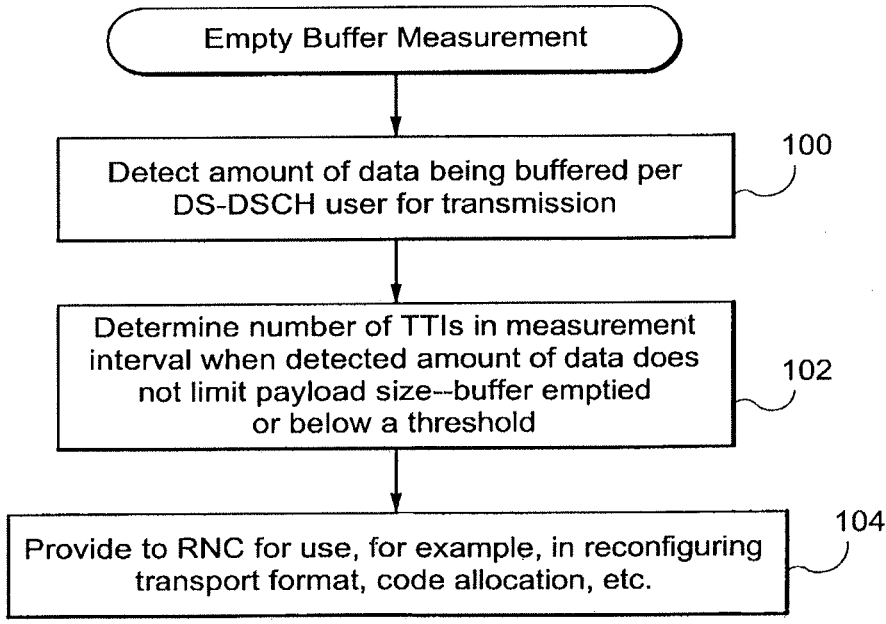
FIG. 13 is a flowchart illustrating example empty buffer measurement procedures.

Average Active Load:

The active load for the HS-DSCH at a certain time instant is the number of users the high speed channel controller 33 can select between at that time instant. As indicated in the average active load measurement flowchart shown in FIG. 12, the average active load monitor 30 detects a number of users currently having data to transmit over the HS-DSCH at the time of the scheduling decision (block 90). For example, if 20 users have data to transmit over the HS-DSCH in the base station buffers at the time when the high speed channel controller 33 makes a scheduling decision, i.e., selects to which user(s) to transmit to, the active load at this time is 20. There could be more users than the active load actually assigned to the HS-DSCH, but it is only those users currently having data in the base station buffers that are included in the active load. The detected numbers collected over a preset time interval are averaged (block 92) and provided to the RNC (block 94). The average active load can be used for admission control, for example, to block users requesting an HS-DSCH if the average active load exceeds a certain limit. Admitting them in this situation would excessively degrade the overall performance of the HS-DSCH. As the transport format measurements described above, the average active load can be defined per priority level.

Empty Buffer:

At each scheduling instant, the high speed channel controller 33 selects a suitable transport format, including the payload size, for the user(s) assigned to the HS-DSCH for the upcoming TTI The payload size depends on the radio channel quality, i.e., a higher (lower) channel quality supports a larger (smaller) payload, and on the amount of data available in the base station buffers. Referring to the flowchart of FIG. 12, the buffer monitor 31 detects an amount of data being buffered per HS-DSCH user for transmission (block 100). The amount of buffered data awaiting transmission for a certain UE forms an upper limit for the payload size, and thus, for the transport format selected. If the transport format is dictated by the data in the buffers rather than by the radio channel conditions, the HS-DSCH is underutilized, and the system is traffic-limited rather than limited by the radio environment. This situation may also indicate a need for more code multiplexing, (e.g., configuration of additional HS-shared control channels), especially if the transport format statistics described above indicate that transport formats with small payloads are used frequently. The buffer monitor 31 determines the empty buffer measurement as the number of TTIs in a defined measurement interval where less data was transmitted than would have been transmitted if the user's data buffer had not been emptied of if the amount buffered is less than a threshold amount (block 102). The empty buffer measurement can either be defined for all traffic regardless of priority, or it can be defined individually per priority level. The empty buffer measurement is provided to the RNC for use, for example, in reconfiguring transport format, code allocation, etc., for the HS-DSCH (block 104).

Figure 14:
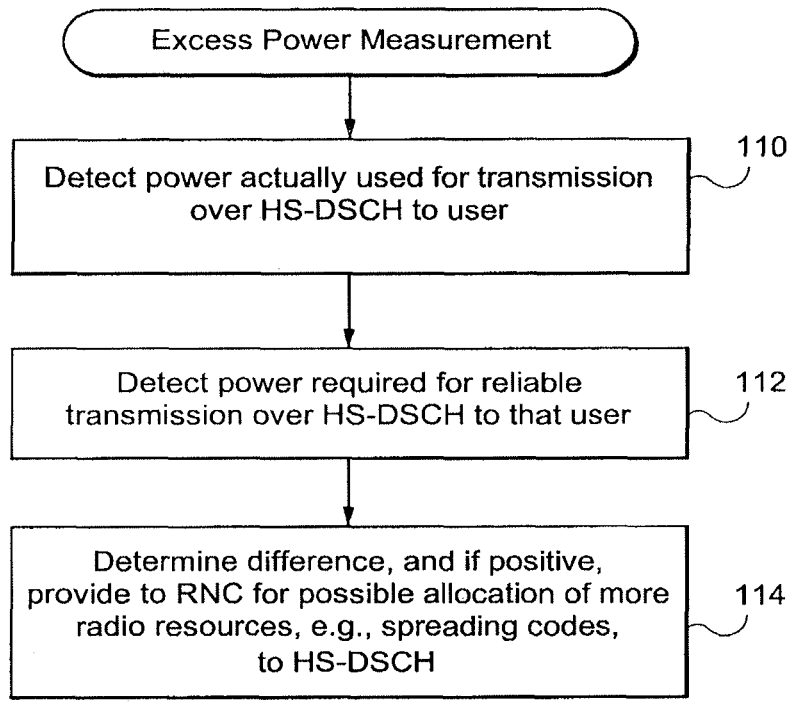
FIG. 14 is a flowchart illustrating example excess power measurement procedures.

Excess Power:

Excess power is the difference between the power actually used for a transmission to a user and the power required for sufficiently reliable transmission that user with the selected transport format. As shown in the flowchart in FIG. 14, the excess power monitor 32 detects power actually used for transmission to a user over the HS-DSCH (block 110). The excess power monitor 32 detects the power required for reliable transmission to that user over the HS-DSCH (block 112) and determines the difference (block 114). If the difference is positive, the excess power monitor 32 sends the excess power to the RNC for possible allocation of more radio resources, e.g., spreading codes, to the HS-DSCH.

An excess power example is illustrated in the graph shown in FIG. 11. The lower circle represents the transport format selected at a certain scheduling instant, and the upper circle represents the power actually used for the transmission with the selected transport format. In the example, the excess power is 4 dB. Preferably, the excess power measurement is the average excess power used during a defined measurement time interval, e.g., 100 ms. A high excess power measurement indicates that the HS-DSCH is not operating in the power-limited region. Power can be used more efficiently by assigning more spreading codes to the HS-DSCH.

As an alternative to specifying a single excess power measurement for the HS-DSCH, the excess power measurement may be defined per transport format or per transport format group. The transport format statistics described above can be used to generate "transport format and resource usage" statistics. So in addition to counting the number of times a certain transport format is used, the average excess power for this transport format is also recorded.

While the present invention has been described with respect to particular example embodiments, those skilled in the art will recognize that the present invention is not limited to these specific example embodiments. Different formats, embodiments, and adaptations besides those shown and described as well as many variations, modifications, and equivalent arrangements may also be used. Accordingly, it is intended that the invention be defined and limited only by the scope of the claims.

What is claimed is:

1. A method for a radio base station supporting mobile radio communication using radio channels including a high speed shared radio channel and a plurality of channels other than the high speed shared radio channel, comprising:
   measuring a transmission power of signals for a dedicated channel dedicated to a connection between the mobile communications network and one or more mobile radios, a common channel shared by the mobile radios, a control channel, and a broadcast channel, but not for the high speed shared radio channel,
   determining a total power of said dedicated channel, common channel, control channel, and broadcast channel; and
   limiting the power consumed by channels other than the high speed shared radio channel based on the total power so that at least a minimum amount of power remains for the high speed shared channel.

2. The method in claim 1, further comprising the radio base station reporting the measured the first radio channels transmission power to a radio resource controller of the radio network controller.

3. The method in claim 1, further comprising:
   measuring a number of mobile radio users currently having data to transmit over the high speed shared channel in a base station buffer at a data transmission scheduling time for the high speed shared channel,
   using the measured transmission powers and the measured number of mobile radio users to regulate a transmission power level for transmitting over the high speed shared radio channel.

4. The method in claim 1, further comprising:
   measuring an amount of data being buffered per high speed shared channel user, determining a number of high speed shared channel transmission time intervals (TTIs) over a measurement period when the measured amount of data does not keep its corresponding buffer loaded with data.

5. The method in claim 1, further comprising:
measuring a first power level actually used for transmission to a mobile radio user over the high speed shared channel,
determining a second power level for reliable transmission to the mobile radio user over the high speed shared channel, and
determining the difference between the first and second power levels.

6. The method in claim 1, wherein the high speed shared channel and the plurality of channels other than the high speed shared radio channel are downlink radio channels from the mobile communications network to one or more mobile radios,
wherein the plurality of channels other than the high speed shared radio channel include one or more of the following: one or more dedicated channels dedicated to a connection between the mobile communications network and one of the mobile radios, one or more common channels shared by the mobile radios, one or more control channels, and one or more broadcast channels.

7. A radio base station apparatus for use in a mobile communications network that supports radio communications using radio channels including a high speed shared radio channel and a plurality of channels other than the high speed shared radio channel, comprising:
one or more detectors configured to measure a transmission power of signals for a dedicated channel dedicated to a connection between the mobile communications network and one or more mobile radios, a common channel shared by the mobile radios, a control channel, and a broadcast channel, but not for the high speed shared radio channel;
a summer configured to determine a total power of dedicated channel, common channel, control channel, and broadcast channel, and
a processor configured to limit the power consumed by channels other than the high speed shared radio channel based on the total power so that at least a minimum amount of power remains for the high speed shared channel.

8. The radio base station apparatus in claim 7, wherein the radio base station is configured to report the total power of said plurality of channels other than the high speed shared radio channel to a radio resource controller.

9. The radio base station apparatus in claim 7, wherein the one or more detectors is:
configured to measure one or more parameters that relates to resource use of the high speed shared radio channel, and
a high speed shared channel controller configured to use the measured one or more parameters to efficiently use radio resources associated with the high speed shared radio channel.

10. The radio base station apparatus in claim 9, wherein the communications are code division multiple access (CDMA) based and the one or more parameters includes CDMA code usage, wherein the one or more detectors is configured to measure CDMA code usage for the high speed shared radio channel during a predetermined time period, and wherein the high speed shared channel controller is configured to use the measured CDMA code usage to regulate CDMA code allocation to the high speed shared radio channel.

11. The radio base station apparatus in claim 7, wherein the one or more detectors are configured to measure a number of mobile radio users currently having data to transmit over the high speed shared channel in a base station buffer at a data transmission scheduling time for the high speed shared channel,
wherein the measured transmission powers and the measured number of mobile radio users are used to regulate a transmission power level for transmitting over the high speed shared radio channel.

12. The radio base station apparatus in claim 7, wherein the one or more detectors are configured to measure an amount of data being buffered per high speed shared channel user, wherein the high speed shared channel controller is configured to determine a number of high speed shared channel transmission time intervals (TTIs) over a measurement period when the measured amount of data does not keep its corresponding buffer loaded with data,
wherein the high speed shared channel controller is configured to use the number of TTIs in performing one or more radio resource operations.

13. The radio base station apparatus in claim 7, wherein the high speed shared channel and plurality of channels other than the high speed shared radio channel are downlink radio channels from the mobile communications network to one or more mobile radios,
wherein the plurality of channels other than the high speed shared radio channel include one or more of the following: one or more dedicated channels dedicated to a connection between the mobile communications network and one of the mobile radios, one or more common channels shared by the mobile radios, one or more control channels, and one or more broadcast channels.

14. A radio network controller for use in a mobile communications network that supports radio communications using radio channels including a high speed shared radio channel and a plurality of channels other than the high speed shared radio channel, wherein the radio network controller is coupled to one or more radio base station, and comprises:
a receiver configured to receive from a said radio base station a determined total power of the plurality of channels other than the high speed shared radio channel, the plurality of channels comprising a dedicated channel dedicated to a connection between the mobile communications network and one or more mobile radios, a common channel shared by the mobile radios, a control channel, and a broadcast channel; and
one or more resource controllers configured to:
manage radio resources for a cell provided by the radio base station, based on the received determined total power of the plurality of channels other than the high speed shared radio channel; and
limit the power consumed by channels other than the high speed shared radio channel based on the total power so that at least a minimum amount of power remains for the high speed shared channel.

15. The radio network controller as claimed in claim 14 wherein the one or more resource controller comprises at least one of an admissions controller, a cell load controller and a radio resource controller configured manage radio resources for the cell.

16. The radio network controller as claimed in claim 15 wherein the radio resource controller is configured to perform admission and congestion actions in order to limit the power consumed by channels other than the high speed shared radio channel based on the measured transmission power so that at least a minimum amount of power remains for the high speed shared channel.

17. A method for a radio network controller in a mobile communications network that supports mobile radio communication using radio channels including a high speed shared radio channel and a plurality of channels other than the high speed shared radio channel, wherein the radio network controller is coupled to one or more radio base station, the method comprising:

receiving from a said radio base station a determined total power of the plurality of channels other than the high speed shared radio channel, the plurality of channels comprising a dedicated channel dedicated to a connection between the mobile communications network and one or more mobile radios, a common channel shared by the mobile radios, a control channel, and a broadcast channel; and managing radio resources for a cell provided by the radio base station, based on the received determined total power of the plurality of channels other than the high speed shared radio channel; and limiting the power consumed by channels other than the high speed shared radio channel based on the total power so that at least a minimum amount of power remains for the high speed shared channel.

18. The method in claim 17, further comprising:

using the received total power of the plurality of channels other than the high speed shared radio channel to perform one or both of congestion control and admission control.

* * * * *